(12) United States Patent
Wright et al.

(10) Patent No.: US 10,229,214 B2
(45) Date of Patent: Mar. 12, 2019

(54) DYNAMIC WEB PAGE NAVIGATION

(71) Applicant: CA, Inc., New York, NY (US)

(72) Inventors: Christopher R. Wright, Washington, PA (US); Michael J. Bauer, Pittsburgh, PA (US)

(73) Assignee: CA, Inc., New York, NY (US)

( * ) Notice: Subject to any disclaimer, the term of this patent is extended or adjusted under 35 U.S.C. 154(b) by 529 days.

(21) Appl. No.: 14/985,917

(22) Filed: Dec. 31, 2015

(65) Prior Publication Data

US 2017/0193122 A1 Jul. 6, 2017

(51) Int. Cl.
*G06F 17/30* (2006.01)
*H04L 29/08* (2006.01)
*G06F 3/0483* (2013.01)

(52) U.S. Cl.
CPC ...... *G06F 17/30873* (2013.01); *G06F 3/0483* (2013.01); *G06F 17/3089* (2013.01); *G06F 17/30221* (2013.01); *G06F 17/30321* (2013.01); *G06F 17/30867* (2013.01); *H04L 67/02* (2013.01)

(58) Field of Classification Search
CPC .................................................. G06F 17/30873
See application file for complete search history.

(56) References Cited

U.S. PATENT DOCUMENTS

| 8,868,637 | B2 | 10/2014 | Rosenstein et al. | |
|---|---|---|---|---|
| 2004/0205587 | A1* | 10/2004 | Draper | G06F 17/2241 715/205 |
| 2006/0173815 | A1* | 8/2006 | Vedula | G06F 17/30899 |
| 2009/0077471 | A1* | 3/2009 | Lahr | G06F 17/30799 715/748 |
| 2010/0161754 | A1* | 6/2010 | Davis | H04L 67/04 709/217 |
| 2012/0047423 | A1* | 2/2012 | Tomkow | G06F 17/241 715/205 |

* cited by examiner

*Primary Examiner* — Syed H Hasan
(74) *Attorney, Agent, or Firm* — Meyertons, Hood, Kivlin, Kowert & Goetzel, P.C.

(57) ABSTRACT

A computer-executed process receives an object that characterizes a navigation capability of a website. The object includes a navigation parameter that specifies a navigation page of the website, and a query parameter that specifies a subset of content of the navigation page. The process also executes a script to dynamically generate a navigation structure based upon the object data. The process detects selection of a navigation component of the navigation structure, and updates an address in a Uniform Resource Locator (URL) bar of the browser with a composite resource identifier to retrieve a requested subset of content of the selected navigation page. The composite resource identifier includes a subordinate resource identifier that identifies the navigation page, which is derived from the navigation parameter and at least one query derived from the query parameter, which specifies the requested subset of content of the navigation page.

20 Claims, 10 Drawing Sheets

DYNAMIC WEB PAGE NAVIGATION

BACKGROUND

Various aspects of the present disclosure relate generally to the navigation and rendering of web pages, and particularly to improvements in the technological fields of computer networking and internet processing by providing objects that facilitate the dynamic generation of navigation structures, and by providing methods and techniques that reduce data transfers in order to render such web pages.

Conventionally, a web page is a structured document that is communicated across a network from a server computer to a client computer. The client computer executes an associated web browser, which renders and displays a visual representation of the web page on a monitor or display of the client computer. In addition to traditional text, web browsers often coordinate various web resource elements, such as style sheets, scripts and images, when rendering a web page. Moreover, typical web pages provide "hypertext", often in the form of a horizontally arrayed menu or a sidebar menu, to facilitate linking to other web pages via "hyperlinks" associated with the hypertext.

BRIEF SUMMARY

According to aspects of the present disclosure, a computer-executed process is provided for the efficient loading and navigation of a web page. This process is a "client-side" process carried out by a computer that is executing a browser to load and display the web page. The process comprises receiving, from a server, an object that characterizes a navigation capability of a website. The object, e.g., a JavaScript Object Notation (JSON) object, includes data comprising a navigation parameter that specifies a navigation page of the website to load into a browser, and a query parameter that specifies a subset of content of the navigation page to load into the browser. The process also comprises executing a script to dynamically generate a navigation structure based upon the object data, the navigation structure having a navigation component selectable to navigate the website. Still further, the process comprises detecting selection of the navigation component of the generated navigation structure, and updating an address in a Uniform Resource Locator (URL) bar of the web browser with a composite resource identifier to retrieve a requested subset of content of the navigation page. The composite resource identifier is generated from the object and includes a primary resource identifier corresponding to an address of the website, a delimiter, a subordinate resource identifier that identifies the navigation page, where the subordinate resource identifier is derived from the navigation parameter and at least one query derived from the query parameter, which specifies the requested subset of content of the navigation page.

According to further aspects of the present disclosure, a computer-executed process is provided for delivering a web page. This process is a "server-side" process carried out by a server computer that communicates with a remote computer, which loads and displays the web page. The process comprises receiving, from a remote computer, a request to access a website. The process also comprises returning to the remote computer, an object that characterizes a navigation capability of the website. The object includes data comprising a navigation parameter that specifies a navigation page of the website to load into a browser, and a query parameter that specifies a subset of content of the navigation page to load into the browser. In this regard, a script executable on the remote computer dynamically generates a navigation structure based upon the object data, where the navigation structure has a navigation component selectable to navigate the website. The process still further comprises receiving from the remote computer, a request for content comprised of a subset of the navigation page. Here, the request is derived from the object data such that the navigation parameter specifies the navigation page, and the query parameter specifies at least one query string that specifies the requested subset of the navigation page. The process yet further comprises sending to the remote computer, the requested subset of the navigation page without responding with the entire navigation page.

According to yet further aspects of the present invention, a system comprises a processor coupled to memory, wherein the processor executes program code stored in the memory to implement an efficient content server that hosts a website having a plurality of navigation pages. The processor executes the program code to receive, from a remote computer, a request to access a website. The processor also executes code to return, to the remote computer, an object that characterizes a navigation capability of the website, the object having data. Here, there object comprises a plurality of navigation parameters, each navigation parameter specifying an associated one of the plurality of navigation pages of the web site to load, and a plurality of query parameters, each query parameter specifying a unique subset of content to present from a corresponding one of the plurality of navigation pages. In this regard, the object enables a script to be executable on the remote computer to dynamically generate a navigation structure based upon the object data, where the navigation structure has navigation components selectable to navigate the plurality of navigation pages of the web site. The processor is further programmed to receive, from the remote computer, a request for content of a select one of the plurality of navigation pages. In this manner, the request is derived from object data including at least one navigation parameter that designates the select one of the plurality of navigation pages, and at least one query parameter that specifies a subset of the select one of the plurality of navigation pages. The processor is yet further programmed to send, to the remote computer, the requested subset of the subset of the select one of the plurality of navigation pages without responding with the entire navigation page.

DETAILED DESCRIPTION

According to aspects of the present disclosure, an easily maintainable and highly efficient navigation structure is provided, which facilitates the dynamic creation of a navigation structure based on the contents of a predefined object, e.g., a JavaScript Object Notation (JSON) object, as will be described in greater detail herein. The structures herein enable a web browser to efficiently load web pages by minimizing data-transfer and rendering time. Moreover, such improvements are realized without the requirement to modify the operation of a web browser. Rather, efficiencies are rendered at least in part, by appending a query string to the hash part of a uniform resource locator (URL) bar in a web browser in such a way so as to allow for page loads to be handled by the developer rather than the browser.

It should be noted that the disclosure herein describes various aspects in the exemplary context of a browser. This is for convenience of discussion only. In practice, the term "browser" as described herein, can be a conventional web browser, an internet-capable software program, an agent, an internet capable dashboard or management tool, etc.

The disclosure improves the technology of computer execution and internet processing by increasing the speed of web page loads by reducing the amount of traffic that must be communicated across a network connection to obtain a web page, when compared to conventional techniques. The disclosure also creates a new and efficient way to store "bookmarks" that reflect query searches into a website, thus allowing the ability to retrieve an exact view comprised of query results, which was previously not possible using conventional techniques. From a developer's perspective, the present disclosure provides a convenient way to manage website development, and to easily and to readily scale a website in an organized manner. Moreover, the present disclosure provides an approach that allows the developer to control the manner in which a browser implements page loads. More specifically, the approaches herein uniquely offer separability between parameters that determine the navigation page to load, and parameters that determine what subset of content to present on an individual web page.

System Overview

Figure 1:
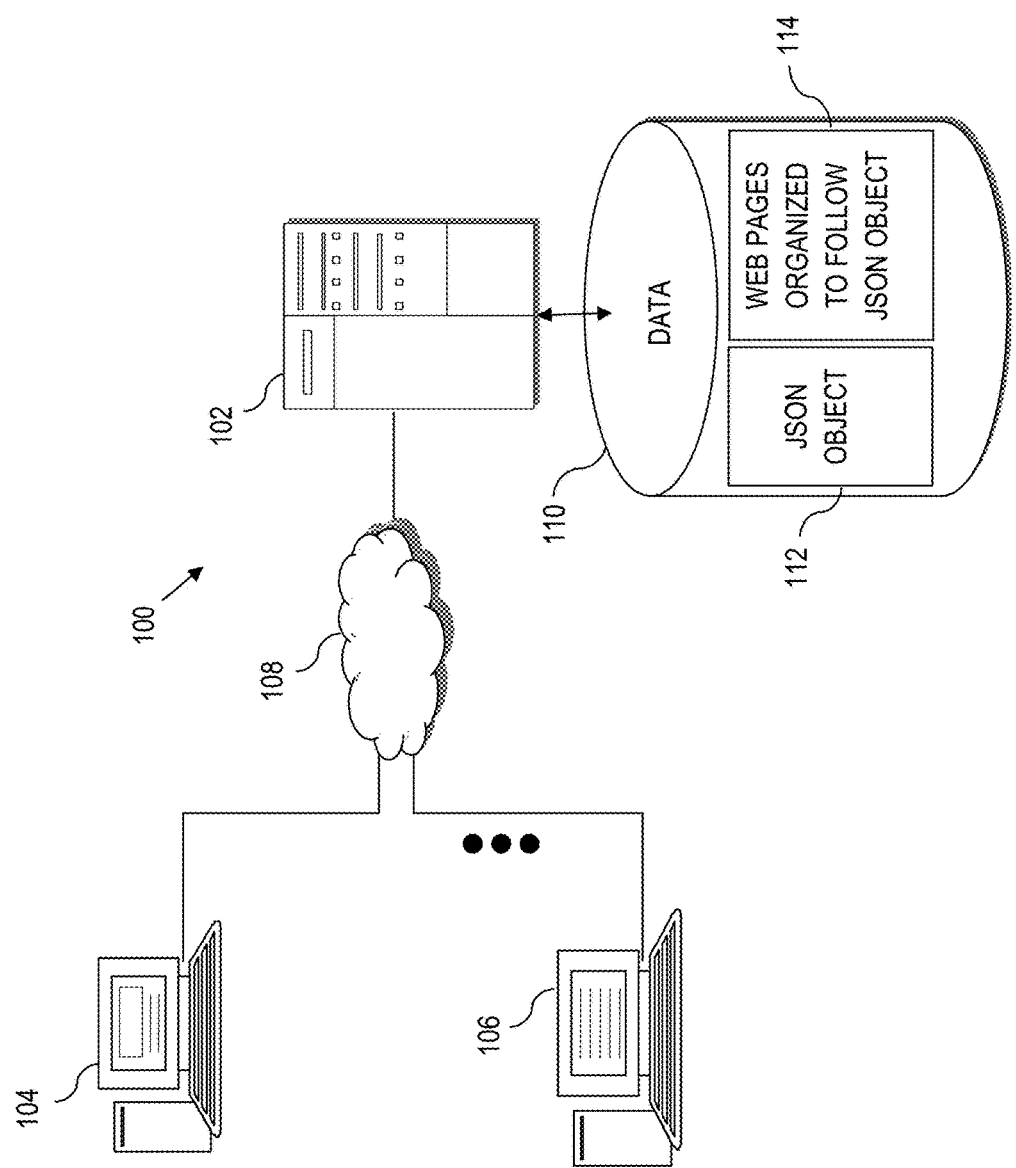
FIG. 1 is an example system in which various aspects of the present disclosure can be carried out.

Referring to drawings and in particular to FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102.

The first machine 102 is a server computer or other processing device that is capable of responding to data transfer requests. In an example implementation, the first machine 102 is a hardware device, such as a web server, appliance, file server, backend server, mainframe server, combination thereof, etc., that executes software to store, process and deliver web pages to remote processing devices, such as the second machine 104 and third machine 106. Alternatively, the first machine 102 can be a virtual server that is ultimately executed on a hardware device.

In order to respond to page requests by remote processing devices, the first machine 102 has access to storage 110, such as any form of storage, including disk(s), network addressed storage (NAS), cloud based storage, or other structure where data can be retrieved. The storage 110 includes among other information, an object 112, illustrated for sake of simplified discussion as a JSON object 112 and a storage structure 114, e.g., set of folders that store a website, such as a collection of web pages and corresponding content stored in a hierarchical folder system. As will be described in greater detail herein, the storage structure 114 is correlated with the content of the object 112. This new structure enables the ability of the developer to efficiently handle and control page loads requested by a browser executing on a remote device. Moreover, the new structure enables the ready and organized scalability of the website as content is added and removed from the website. In this regard, the first machine 102 is an example machine that can carry out the "server-side" processes described herein.

The second machine 104 and third machine 106 each comprise a hardware processing device that is capable of communicating over the network 108 to request and/or receive data from the first machine 102. In this regard, the second machine 104 and the third machine 106 are also referred to herein as remote computers or client-side computers. For instance, typical processing devices include personal computers, notebook computers, netbook computers, tablets, smart phones, and other portable communication devices, smart appliances, etc. In particular, each of the second machine 104 and third machine 106 execute software such as a web-enabled application (e.g., web browser, web crawler, web enabled application, combinations thereof, etc.) to exchange data with the first machine 102. The first machine 102 and second machine 104 are example remote computers that can carry out "client-side" processes for the efficient navigation and loading of a web page, as will be described in greater detail herein.

The network 108 provides communication links between the various processing devices, e.g., the first machine 102, the second machine 104, and the third machine 106. Accordingly, the network 108 can be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented.

Overview of Client-Side Processing

Figure 2:
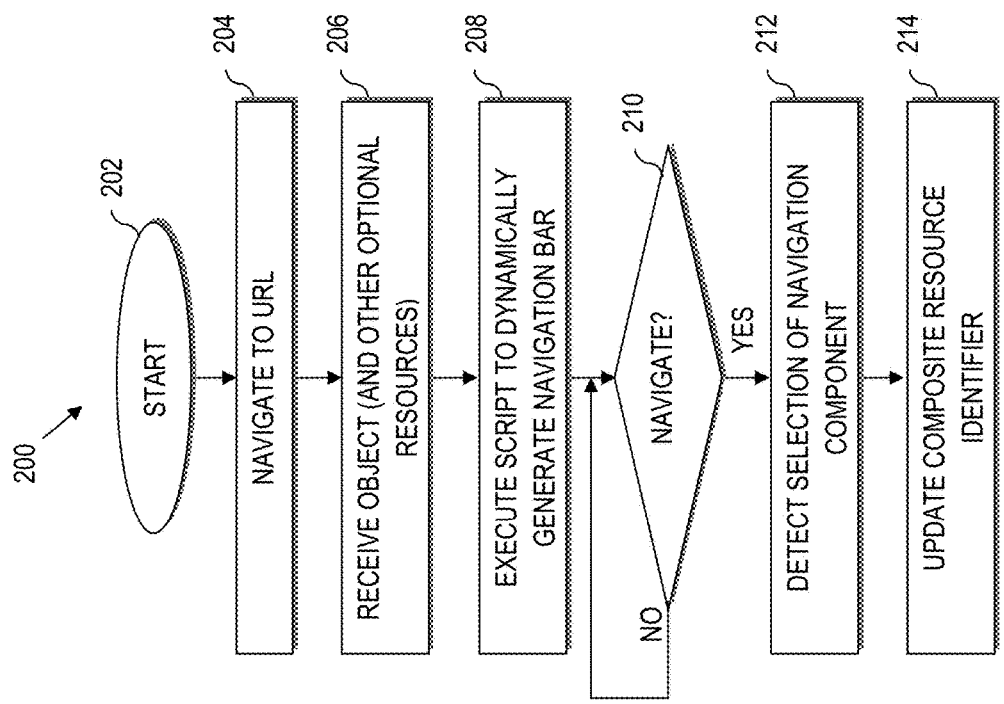
FIG. 2 is a flow chart of an example computer-executed process for the efficient navigation and loading of a structured document according aspects of the present disclosure.

Referring to FIG. 2, a computer-executed process 200 is provided for the efficient loading and navigation of a web page into a web-enabled application. The computer-executed process 200 can be executed on a computer system (e.g., a hardware computer system such as the second machine 104 or third machine 106 of FIG. 1). More particularly, the computer-executed process is carried out by a (remote) client-side computer that interacts with a server to obtain a web page. In this regard, the computer-executed process 200 can be implemented on computer-readable hardware that stores machine-executable program code, where the program code instructs a processor to implement the described computer-executed process 200. The computer-executed process 200 can also be executed by a hardware processor coupled to physical memory, where the processor is programmed by program code stored in the memory, to perform the described process.

The computer-executed process 200 starts at 202. The process 200 comprises navigating at 204 to a website. This is typically implemented by entering an address into a uniform resource locator (URL) bar of a corresponding web browser. The process 200 also comprises receiving, at 206, an object, such as a JSON object, which characterizes a navigation capability of a website. Here, the object is received from a server (e.g., the first machine 102 of FIG. 1). The object (described more fully herein) includes data comprising a navigation parameter that specifies a navigation page of the website to load into a browser, and a query parameter that specifies a subset of content of the navigation page to load into the browser. More typically, the object will include a plurality of navigation parameters, each navigation parameter specifying an associated one of the plurality of navigation pages of the website to load, and a plurality of query parameters, each query parameter specifying a unique subset of content to present from a corresponding one of the plurality of navigation pages.

In certain implementations, other resources are received with the object, such as scripts and other code necessary to carry out the process, where such resources are not otherwise available at the client-side computer. For instance, scripts may be provided that contain logic for processing the hash and query strings. As another example, a JavaScript can be used to put an event listener on a window.hashchange event.

In particular, process 200 comprises executing at 208, a script to dynamically generate a navigation structure based upon the object data. The navigation structure can be implemented as a navigation bar or column, a top level navigation bar with a secondary vertical navigation bar for the subpages, a single navigation bar with a drop down menu of the subpages, alternative configurations, combinations thereof, etc. An example of the dynamic generation of the navigation structure is described more fully herein.

The process 200 further comprises determining at 210, whether any navigation component of the navigation structure has been operated. If there is no operation of the navigation structure, the process 200 waits. Otherwise, if a navigation feature of the navigation structure has been operated, the process 200 implements detecting at 212, the selection of the navigation component of the generated navigation structure. This is performed in such a way as to determine a selected navigation page of the website to load and which subset of the selected navigation page to load.

The process 200 next performs updating, at 214, of the address in the Uniform Resource Locator (URL) bar of the corresponding web browser. The address is updated with a composite resource identifier to retrieve the requested subset of content of the selected navigation page. In this regard, the composite resource identifier is generated from the object so as to include a primary resource identifier corresponding to an address of the website, a delimiter (e.g., a hash mark), a subordinate resource identifier that identifies the selected navigation page, and at least one query that specifies a subset of content of the selected navigation page.

As will be described in greater detail herein, the process 200 can perform additional capabilities. For instance, the process may perform initiating a hashchange event in response to detecting an event indicative of a change in the composite resource identifier for changes occurring after the delimiter (e.g., to the subordinate resource identifier, query string, etc.). Thus, once the composite resource identifier in the URL bar is updated, the process can detect the change (using the hashchange.event), reformat the composite resource identifier into one or more appropriate asynchronous JavaScript and extensible markup language (AJAX) call, and obtain the appropriate content from the server. This can be accomplished for instance, by using JavaScript to put a listener on a window.hashchange event, and by detecting, by the listener, an action triggered by the window.hashchange. In this manner, an update can occur regardless of whether the composite resource identifier has been edited by the dynamically generated navigation structure, by a user (e.g., by typing over the composite resource identifier directly in the URL bar), or by some other action, such as a selection of an element in a graphical user interface of the browser that triggers an update to the composite resource identifier.

As will be described in greater detail herein, the process can yet perform other desired processes, such as detecting an action for bookmarking a context based upon the composite resource identifier such that when a user returns to a bookmarked page, the page will be loaded to the bookmarked context with no need to re-click a button to return to the desired context. The process may additionally perform features such as providing within a user interface of the browser, a control that allows a user to specify what information to display, and at what interval to refresh that information based upon updates to the composite resource identifier, rendering multiple sections of information on the navigation page, where a query string associated with the query parameter of the object allows a user to specify which of the multiple sections of information to view, combinations thereof, etc.

Overview of URL Entry

Figure 3:
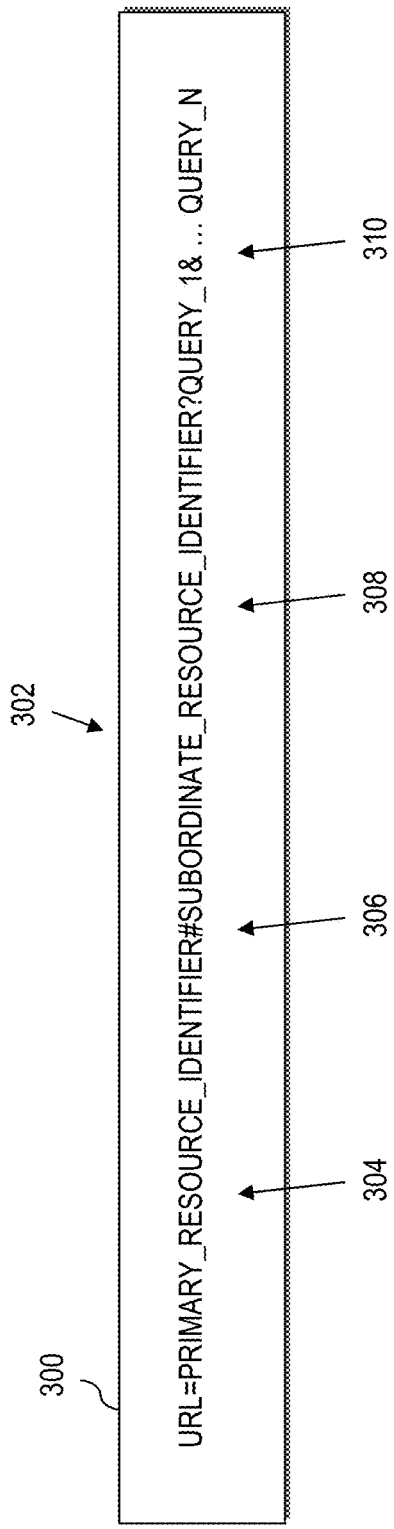
FIG. 3 is an example uniform resource locator format to facilitate improved navigation according to aspects of the present disclosure.

Referring to FIG. 3, a web browser includes a Uniform Resource Locator (URL) bar 300. The URL bar 300 is a graphical control element that functions as an "address bar" to identify and show the current URL, and hence, the current website loaded by the browser. Thus, the URL bar is a primary navigation tool of the web browser.

According to aspects of the present disclosure, an example composite resource identifier 302 (e.g., a composite resource identifier used to update the URL address at 214 of the process 200 of FIG. 2) inserted into the URL bar 300 of a corresponding web browser includes a primary resource identifier 304, a delimiter 306 (e.g., a hash mark in this example implementation), and a subordinate resource identifier 308. The primary resource identifier 304 is a conventional address to the website. The hash mark 306 is a device that distinguishes the primary resource identifier 304 from the subordinate resource identifier 308. In this regard, the hash mark 306 instructs the browser to focus on a specific fragment or specific location within the website identified by the primary resource identifier 304. The subordinate resource identifier 308 identifies a specific navigation page to be rendered by the web browser.

The composite resource identifier 302 can also include at least one query 310. For sake of example, a query 310 is defined by appending a question mark symbol ("?") after the subordinate resource identifier 308. Multiple queries can be inserted into the composite resource identifier 302 by concatenating multiple queries using a suitable operator, e.g., the ampersand ("&") in this illustrated example.

The object is specified so that a navigation system is dynamically generated that separates the navigation page to load (identified by the subordinate resource identifier 308) and what to present on each individual navigation page (identified by the query 310).

Notably, any updates to a conventional query string in the URL bar of a web browser trigger a complete reload of the page. Therefore, the user must wait for the common assets to be reloaded, even those assets not requested or desired in a particular view of the web page. However, the process herein controls the manner by which the loading of content is optimized to maximize speed and minimize data-transfer. More specifically, by appending a query string to the hash part of the URL bar (described with reference to FIG. 2 and FIG. 3 above), page loads are handled by the developer rather than the browser. In this regard, the developer can modularize the design of the website to require loading less data (including operations that avoid loading non-requested assets from a page). Such an approach is further simplified by using an object that correlates navigation pages stored by the server with navigation elements described in the object.

As noted in greater detail herein, an object (such as a JSON object 112 of FIG. 1, the object used in the process 200 of FIG. 2, etc.) is used to encapsulate or otherwise characterize a navigation capability of a website. In this regard, the object includes data comprising navigation parameters that specify a navigation page of the website to load, and query parameters that specify a subset of content to present on an associated navigation page. In this regard, the disclosure herein is unique in that it offers more separability between parameters that determine the navigation page to load and those that determine what to present on each individual page. For instance, the approaches herein make it much easier for multiple developers to work on large projects as each page has its own query string to handle the options on their specific page. Here, the hash part is used only for higher level navigation.

Example Navigation Structure Generation from the Object

While any suitable object structure can be utilized, JSON is convenient because JSON is a language independent, lightweight data interchange format consisting of an unordered collection of attribute-value pairs, which lends itself to describing a navigation structure. The attribute-value pairs not only define the navigation of the structured document, but also correlate with the manner in which content is stored (such as via the storage structure 114 of FIG. 1). Moreover, since JSON is the standard object format of the JavaScript language, no additional parsing of a string is needed to use a JSON object. Had another data transport, such as XML, been used, then the JavaScript would have to parse such an object into a JSON object for efficient processing.

Moreover, the use of the JSON object provides a manageable organizational structure resulting in high maintainability of a website. For instance, as new pages are added to a website, the object can be simply and readily updated. By updating the object, the design of the navigation structure automatically and dynamically updates without recoding the website. Correspondingly, conventional approaches to develop and maintain all of the necessary HTML can become cumbersome as more web pages are added to the site, leading to disorganized code.

Assume for sake of a simplified example, that a web page is to be generated. The developer builds a JSON object (e.g., JSON object 112 of FIG. 1, object used in the process of FIG. 2, etc.) that describes the navigational features of the web page. In this non-limiting example, assume that a navigation structure is generated via a JSON object described in pseudocode below. The object is parsed to generate corresponding html or other suitable code.

```
navbarContents = {
    overview: {
        text: "OVERVIEW",
        menulinks: [
            {text: "OV A", href: "overviewA.html", helplink:
            "/Overview+A"},
            {text: "OV B", href: "overviewB.html", helplink:
            "/Overview+B" },
            {text: "OV C", href: "overviewC.html", helplink:
            "/Overview+C" }
        ]
    },
    details: {
        text: "DETAILS",
        menulinks: [
            {text: "DT A", href: "detailsA.html", helplink:
            "/DetailsA", queryString: "view=DetailA"},
            {text: "DT B", href: "detailsB-D.html", helplink:
            "help.html?select", queryString: "view=DetailB"},
            {text: "DT C", href: "detailsB-D.html", helplink:
            "help.html?select", queryString: "view=DetailC"},
            {text: "DT D", href: "detailsB-D.html", helplink:
            "help.html?select", queryString: "view=DetailD"}
        ]
    },
    utilities: {
        text: "UTILITIES",
        menulinks: [
            {text: "UT A", href: "utilitesA.html", helplink:
            "index.htm?none?helpUTA.html"},
            {text: "UT B", href: "utilitiesB.html", helplink:
            "index.htm?none?helpUTA.html"}
        ]
    }
}
```

The corresponding structure (e.g., the storage structure 114 of FIG. 1) stored in memory as a hierarchical folder structure may thus look as follows:

```
Web page - main level
    /OVERVIEW
        /overviewA
            overviewA.html
            /itemX
                SummaryData.html
                SummaryCharts.html
                OverallUsage.html
                Alerts.html
                ProtocolUsageandTraffic.html
            /itemY
                itemY.html
                ...
            /itemZ
                itemZ.html
            ...
        /overviewB
            overviewB.html...
```

-continued

```
        /overviewC
                overviewC.html
                ...
    /DETAILS
        /detailsA
                detailsA.html
        /detailsB
                detailsB-D.html
    /UTILITIES
        /utilitiesA
                utilitiesA.html
```

Example pseudo-code to generate the navigation structure based upon the object comprises:

```
Load the JSON object into memory.
for i in object (standard JS for in loop)
        generate html element with id i and text object[i].text
        place generated element into a string to be output later
end for
output string containing html to the browser to display the formatted navigation bar place
event listeners on the generated elements to listen for mouse clicks
//This next part depends on which element in the primary navigation bar was
clicked
remove any previous event listeners on the secondary navigation bar and then
        remove the elements from the page.
get the id of the loaded main nay by splitting the hash contents on the '-' and
        examining the first part and place it into mainID
if menuLinks of object[id] is set then
        load menuLinks of object[mainID]
end if
else
        load menuLinks of a pre-programed default
end else
for i = 0 to menuLinks.length
        load menuLinks[i] into link
        generate an html element with the folowing properties:
                text:       link.text
                id:         equal to 'mainID-' + (the contents of link.href minus the
                            '.html' portion
                data-url: link.href
                data.help: link.helpLink
    if menuLinks[i].queryString is set then
                convert '&' to '____' and '=' to '__'
                append '_____' + the converted queryString to the ID
                        of the element we just created
        end if
        place the generated element into a string to be output later
end for
output the string containing html to the browser to display the formatted secondary
    navigation bar
place event listeners on the generated elements to listen for mouse clicks
```

Note here the use of a partial query string in this object, which is illustrated by way of example to show the ability to use the same page to display different views. That is, in the present example, the navigation structure has three separate links that link to the same page (detailsB-D). This approach is not required, but provides the benefit of effectively organizing pages into the same HTML file, thus enabling the re-use of code that generates the views. Notably, the JSON object and the file structure on the server share a similar layout. Given this layout, once files are in the correct folder, and the object is in agreement with the file structure, there is no need to worry about navigation because the navigation structure is dynamically built in a manner that follows the actual files available by the website. Moreover, there is no co-dependency of individual navigation pages. Rather, each navigation page must be able to handle its own queries. That is, the server calls a function that must exist to generate the correct content. As such, each navigation page is to some degree, self-contained, yet the navigation pages can talk to each other in order to provide the correct context.

Figure 4:
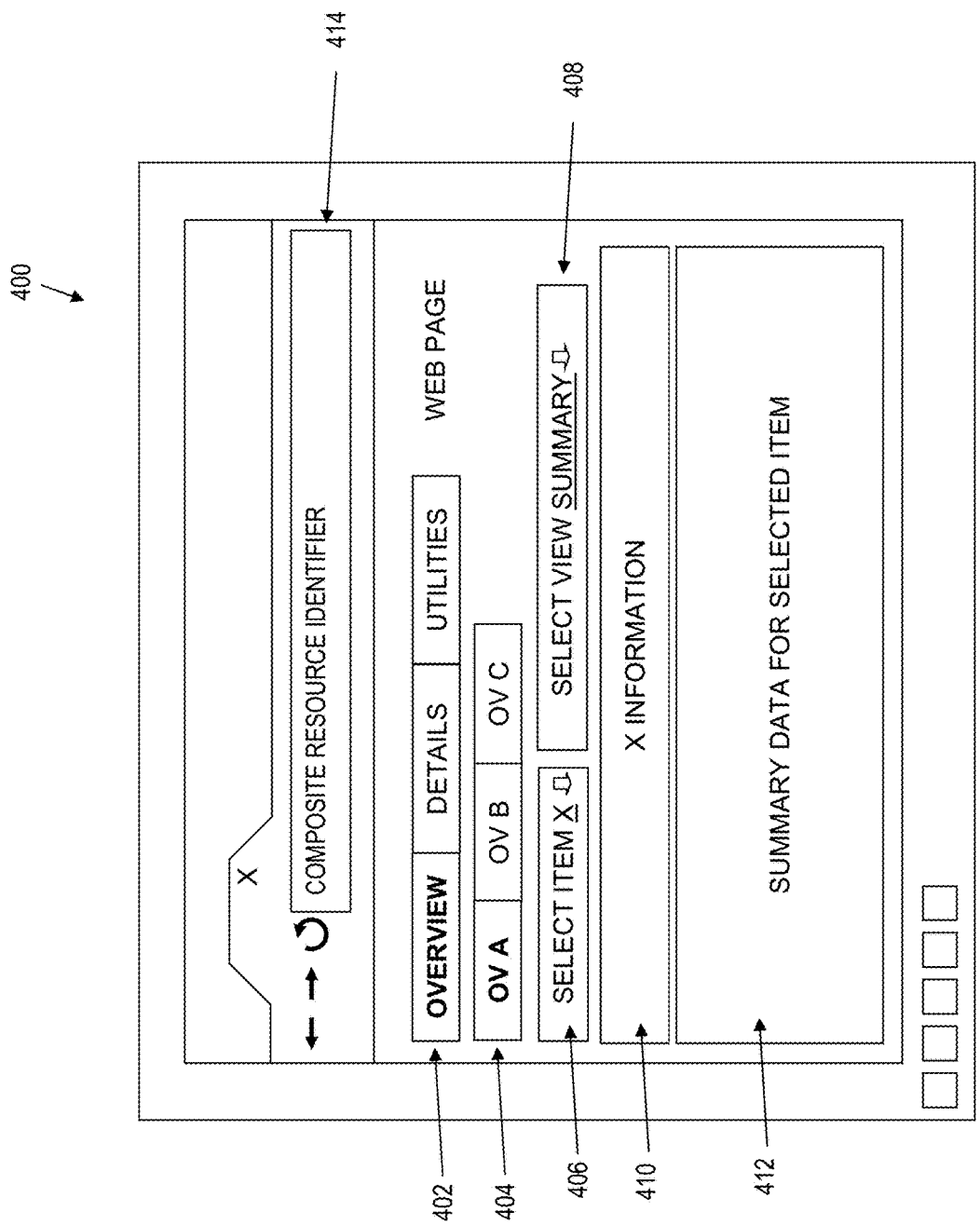
FIG. 4 is a simplified screen shot of an example structured document according to aspects of the present disclosure.

Referring to FIG. 4, an example rendering of a web page within a web browser 400 is provided using the above-example JSON object. With brief reference back to FIG. 1, assume the second machine 104 executes a browser that navigates to website.html hosted by the first machine 102. The first machine 102 sends back to the second machine 104, some resources, including the JSON object and one or more scripts. The first script reads the JSON object and dynamically builds a navigation menu.

In this illustrative example, the user has navigated the web browser to the OVERVIEW section, submenu overviewA.html (thus the overviewA web page is the subordinate resource identifier). Keeping with the above-example, the screen shot of the web page in FIG. 4 illustrates a two-layer navigation system defined by the object for sake of example. The first navigation layer 402 includes three tabs, including OVERVIEW, DETAILS, and UTILITIES. In this example, OVERVIEW is selected.

Moreover, in this example, OVERVIEW includes three sub-tabs in a secondary navigation layer 404, including OV A, OV B, and OV C. The sub-tab OV A was selected (by default or otherwise). This OVA tab provides a page with three main areas, including a drop down 406 to select an item, a drop down 408 to select a view, and a display area 410 to display general information on the selected item and a display area 412 to display details on the selected item. This configuration is solely for purposes of discussion and is not intended to be limiting.

The structure allows for a web-enabled application to efficiently load web pages by minimizing data-transfer and rendering time. The efficiencies are rendered at least in part, by appending a query string to the hash part of a uniform resource locator (URL) bar in a web-enabled application, allowing for page loads to be handled by the developer rather than the browser.

Assume that the user has selected item X from the drop down 406, and "Summary" as the selected view from the drop down 408. When this occurs, a script on the browser updates the URL address in the URL bar 414 with a composite resource identifier to reflect the selected view of the web page, e.g.:

---
website.html#OVERVIEW-overviewA?variable1=selectItemX&variable2=showDataSummary

---

This particular state, i.e., the navigation page as rendered in the browser, along with results of the queries, is referred to herein as a "context". Thus, a single navigation page, e.g., overview.html in this example, can have several contexts, depending upon the query capability of that navigation page.

To implement the update, the client computer receives the window.hashchange event and then uses that to determine which page to load based upon the known directory structure given the JSON object. The client computer then requests the appropriate page to load from the server, e.g., the first machine, via AJAX. This loaded page has a completely different URL than the one displayed in the URL bar of the browser.

In general, in response to the AJAX request, the server, e.g., the first machine 102 of FIG. 1, sends back the appropriate contents, e.g., the contents associated with a folder corresponding to overviewA.html, and the summary data for item X. Notably, overview.html also includes additional information, such as Summary Charts, Overall Usage, Alerts, etc. However, since these items are not responsive to the query, the entire page is not loaded. Rather, only the necessary items are loaded. This is efficiently handled by the hierarchical storage of the data, which is tightly correlated to the structure defined by the JSON object. For instance, in an example implementation, a file relative to website.html called OVERVIEW/overviewA/overviewA.html is loaded via jQuery Ajax and is placed in a container DIV on the page in the web browser. In this example, when loading OVERVIEW-overviewA, the URL might look like:

http://www.example.com#OVERVIEW-overviewA

The AJAX request would be to load:

http://www.example.com/OVERVIEW/overviewA/overviewA.html

Figure 5:
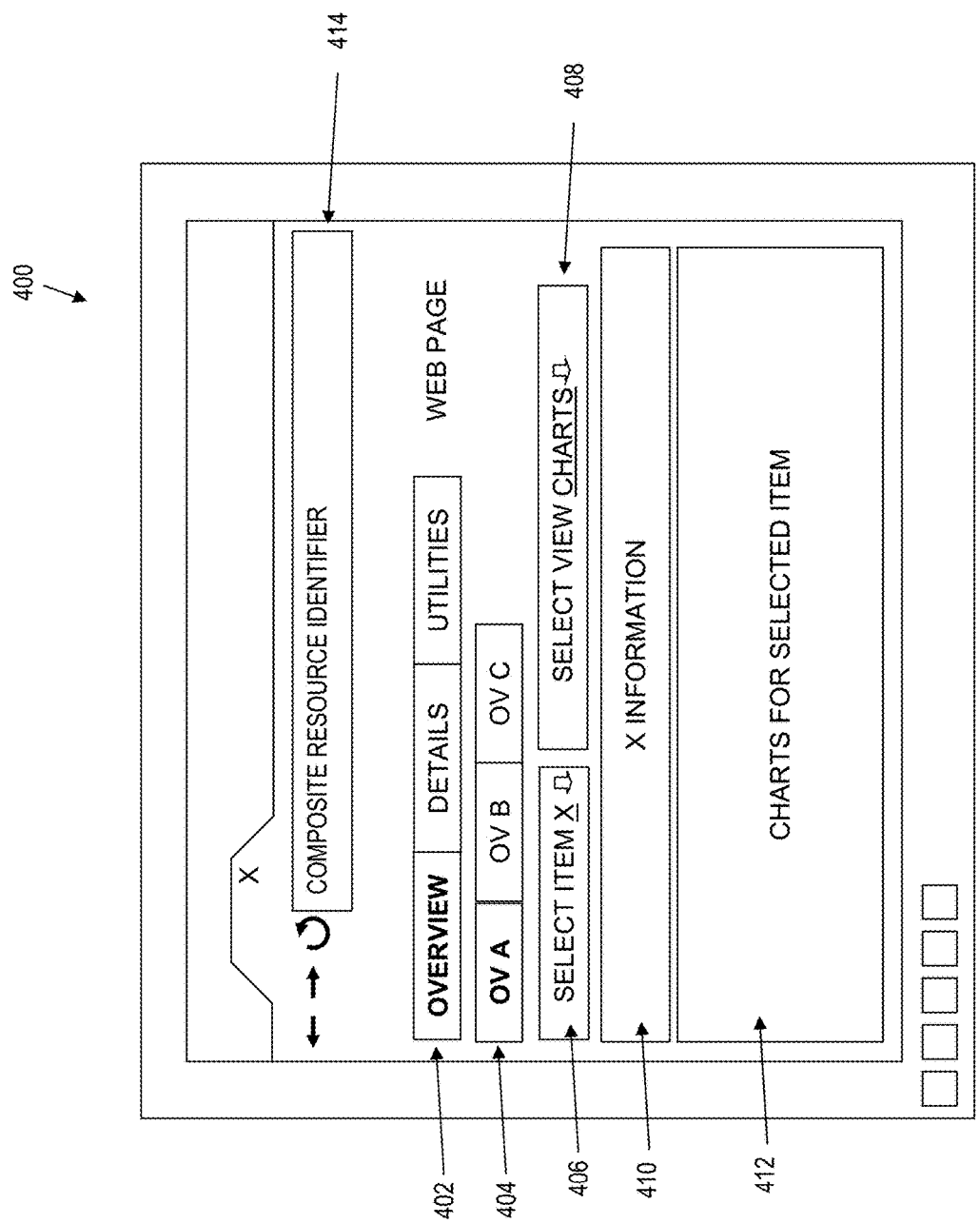
FIG. 5 is a simplified screen shot of a second example structured document that forms part of a website along with FIG. 4, according to aspects of the present disclosure.

Referring to FIG. 5, now assume that the user navigates to a new section, e.g., charts for item X. For instance, a user can utilize the drop down 408 to change the selected view to charts. In response, a script updates the address with a new query string:

---
website.html#OVERVIEW-overviewA?variable1=selectItemX&variable2=showCharts

---

A conventional navigation method would trigger an entire reload of overview.html, including summary data, charts, usage and alerts. However, only the query for variable 3 has changed. As such, the server only responds with the new information (Charts). Because common assets such as item X and overviewA have not changed, those portions of the web page are not re-downloaded.

In response to a user interacting with the navigation structure, the process causes an update of the query string triggering a "hashchange" event which is handled to generate the new content. In an example implementation, a hashchange event is fired when a fragment identifier of the URL has changed (including the subordinate resource identifier, query or both). This approach provides advantages over conventional approaches in addition to faster, less memory intensive page loads. For instance, in this example, the server parses the hash part of the URL. The overviewA.html is already loaded. As such, JavaScript handles the parsed query string to only load the necessary content (e.g., charts). That is, the server can further execute instructions to determine that a web page associated with the subordinate resource identifier has already been loaded, and respond by executing the at least one query and returning only the query results.

Moreover, the present approach allows for contexts to be bookmarked. When a user returns to the bookmarked page, it will be loaded to their desired context. There is no need to re-click buttons to return to the desired context. As an example, assume that a user diagnoses a critical error upon analyzing presented data. The user can set a bookmark, then the user can escalate the issue to a manager, such as by simply sending a link to the critical information via the bookmark. The manager will be taken to the same screen in the context that user diagnosed the problem.

Figure 6:
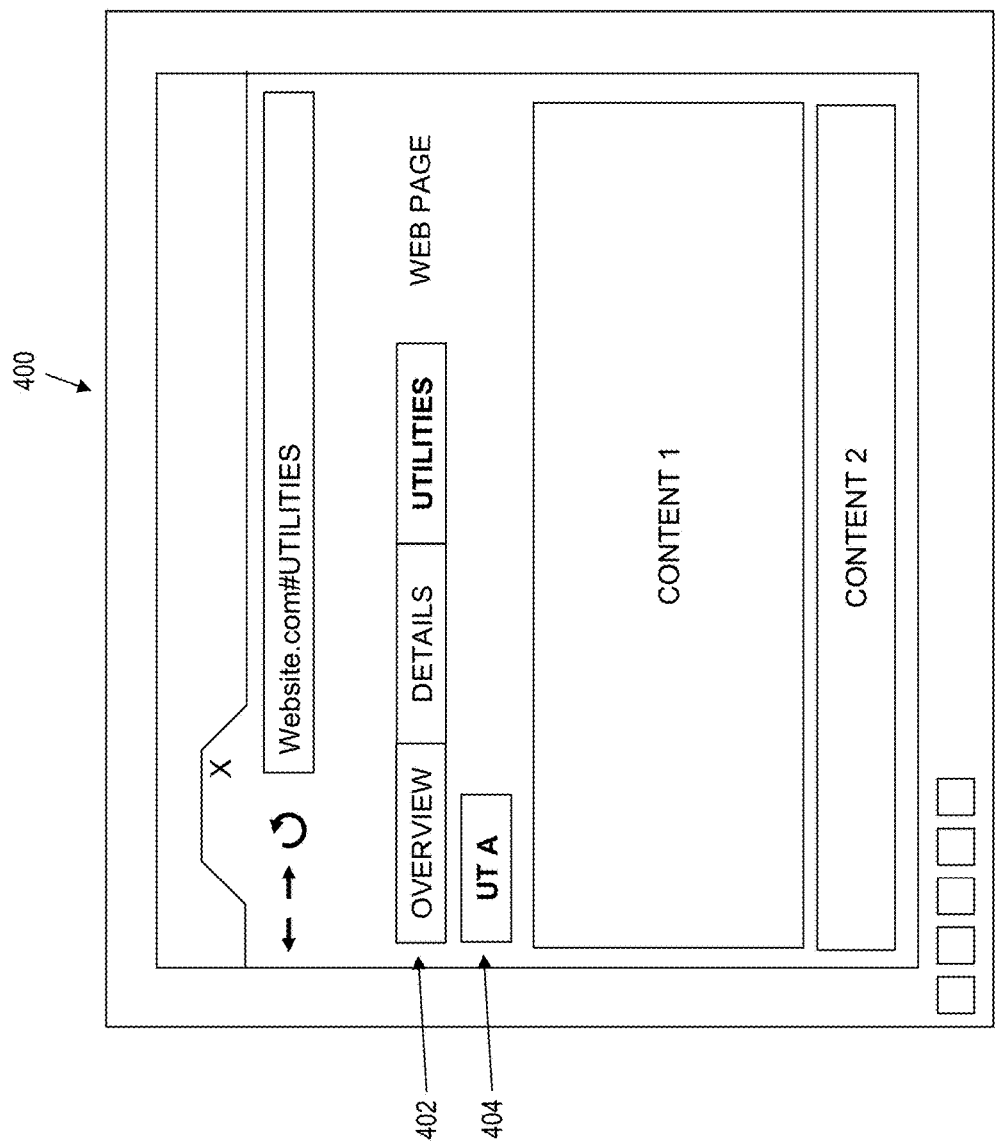
FIG. 6 is a simplified screen shot of a third example structured document that forms part of a website along with FIG. 4 and FIG. 5, according to aspects of the present disclosure.

Referring to FIG. 6, assume now that a user navigates to the utilities tab. The system updates the URL bar to website.html#UTILITIES-utilitiesA. Now, the sub tabs of the secondary navigation layer 404 must change to reflect the new options available for the utilities page. Moreover, the main content in the body of the page changes. However, there is no need to reload the main navigation menus from the first navigation layer 402.

Thus, the disclosed navigation solution optimizes page loads by only loading the necessary content while retaining many of the features of common web page navigation. In the example, the navigation structure and display area 410 of the page did not need reloaded which increased performance. For instance, the processes herein allow for a minimal number of AJAX calls to be made, which increases performance and decreases data-transfer between client and server. The benefits of this can be large because web pages may share some large common files. By using the processes herein, these large files need only be loaded once. An example of these benefits is discussed later with regard to FIG. 8.

The above-example is illustrated as a system-monitoring type application having multiple sections of information that are presented on a single screen (where the browser renders multiple sections of information in a single document). Here, the query string allows the user to specify what pieces of information they would like to view. However, the applications of the processes herein are not limited to such.

Notably, the ability to correlate navigation pages by the developer with the object, allows the developer to handle numerous other considerations to benefit the user experience. For example, say a user wishes to view various pieces of information at the same time but certain information is more time-critical. The user can now choose which pieces of information to refresh at what intervals. The user would receive the content that is most important to work more efficiently.

As another example, assume a user refreshes the browser. The refresh causes a reload of the entire page. However, the system will return to the same context that existed immediately prior to the refresh because the query string determines what is populated on the page. (e.g., item X and Charts in the example of FIG. 5).

Figure 7:
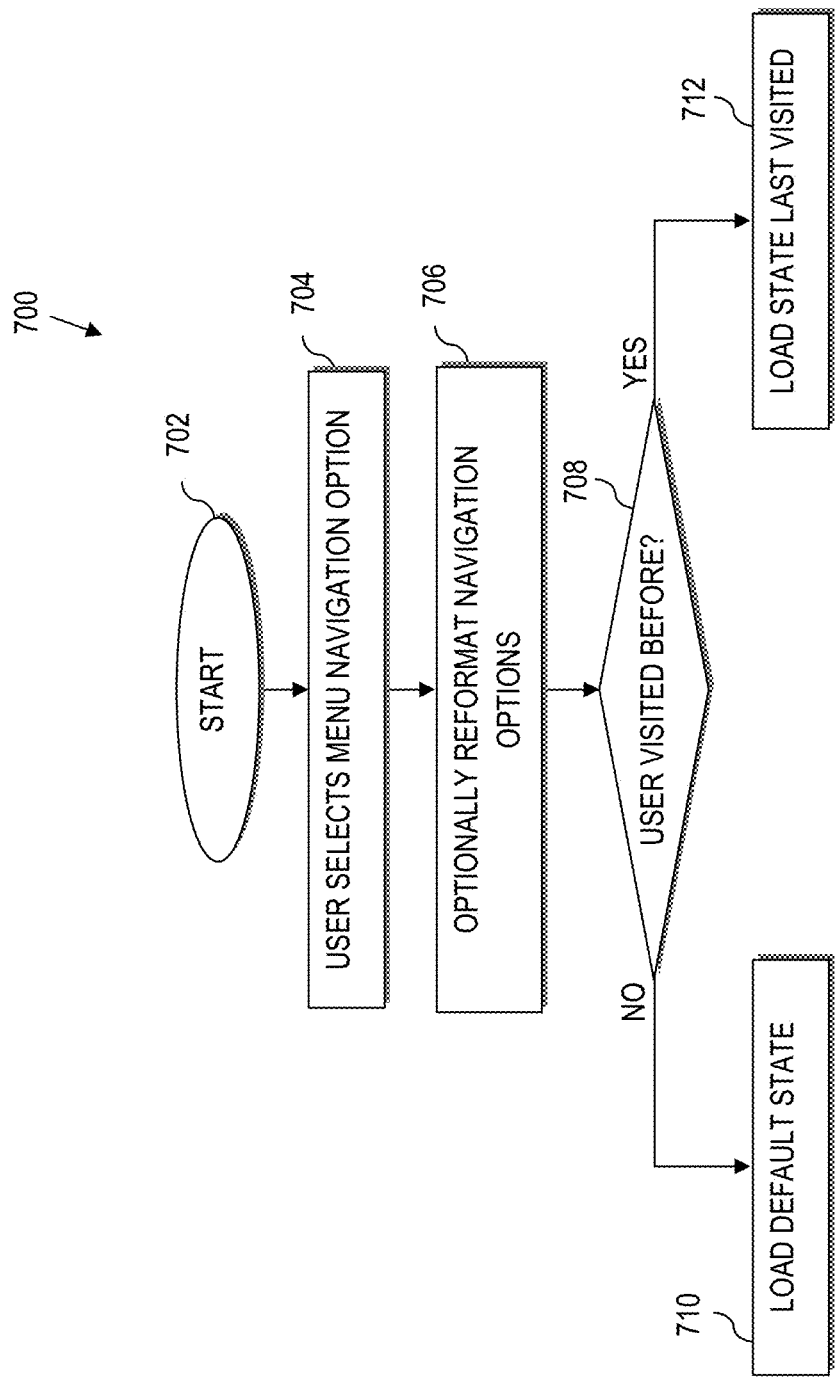
FIG. 7 is a flow chart illustrating a computer-executed process for the efficient loading of a structured document according to aspects of the present disclosure.

Referring to FIG. 7, a computer-executed process 700 illustrates the execution of the web-enabled application as the user navigates a website created and implemented using the techniques herein. The computer-executed process 700 can be executed on a computer system (e.g., a hardware computer system such as the second machine 104 or third machine 106 of FIG. 1). The process 700 is also usable with the process 200 of FIG. 2, and the techniques of FIGS. 3-6. In this regard, the computer-executed process 700 can be implemented on computer-readable hardware that stores machine-executable program code, where the program code instructs a processor to implement the described computer-executed process 700. The computer-executed process 700 can also be executed by a hardware processor coupled to physical memory, where the processor is programmed by program code stored in the memory, to perform the described process. The process starts at 702. At 704, the process detects that a user selects a menu navigation option. This can be implemented for instance, by listening for a hashchange event. At 706, the process optionally reformats the navigation options, e.g., to account for new tabs, menus, submenus, etc. of the new page (examples of which are set out in FIG. 4, FIG. 5, and FIG. 6.

The process determines at 708 whether a user visited the specific navigation option before. If the process detects that the user has not visited the selected section before, the process loads a default state, as described more fully herein. On the other hand, if the process determines that the user has visited the section before, the process can load at 712 the last visited state. For instance, in the example herein discussed with reference to FIG. 4, the user specifically visited website.html, and navigated to the OVERVIEW tab, selected OV A submenu option, and from within that submenu, selected item X from the drop down to view the details on item X. If the user navigated off OV A to another page or another tab, and then navigated back, the process can automatically load the details of item X in the same state as the last time that set of options was selected by the user. The overviewA.html page, which is in a single folder, has several views (e.g., Summary, Charts, etc.) controlled by the query. As such, different views of the same navigation page can be independently managed.

For instance, assume the server receives from the remote computer, a request for data. As noted more fully herein, the remote computer requests data by formatting a composite resource identifier (e.g., a primary resource identifier, a hash mark, a subordinate resource identifier that identifies the selected navigation page, and at least one query that specifies a subset of content of the selected navigation page). Scripts and AJAX calls are used to convert the composite resource identifier to message that can be acted upon by the first server. Accordingly, the server (via the AJAX calls) can use the subordinate resource identifier to identify a navigation page selected by a web browser executed by the remote computer, and identify a subset of the identified navigation page to return based upon executing the at least one query against the identified navigation page.

The process 700 can handle a number of other capabilities as well. For instance, the process 700 may handle login and authentication of users. Moreover, the process 700 may perform verification and error trapping of the composite uniform resource identifier. For instance, if a subordinate resource identifier or query parameter is judged to be invalid, the server can replace the incorrect values with default values.

Moreover, as noted herein, the server stores each navigation page of the website in an organizational structure identifiable from the content of the object file. For instance, storing each navigational page can be implemented by creating a hierarchical arrangement of storage folders, each folder storing a corresponding navigation page in a manner that corresponds to the navigation parameters of the object. By keeping navigation pages modular and separate, smaller loads can be realized, resulting in less traffic to display the content desired by an end-user.

Yet further, maintenance and management of a website becomes simplified. Assume that the website developer of the website of FIG. 4, FIG. 5 and FIG. 6 wants to add a new tab, "CONTACT US". By creating a new folder and adding to the folder the correct ContactUs.html, and by updating the JSON object, the web browser upon refresh automatically generates the new menu option. Thus, no significant code changes are required to affect navigation.

Server-Side Processing Example

Figure 8:
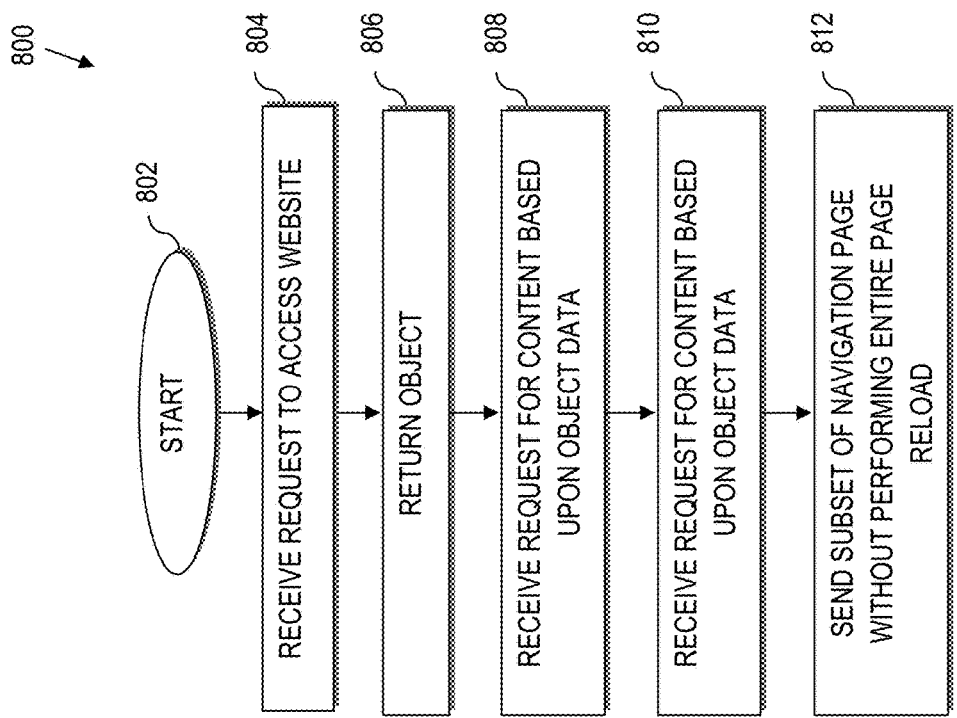
FIG. 8 is a flow chart illustrating a computer-executed process for the efficient navigation of a structured document according to aspects of the present disclosure.

Referring to FIG. 8, a computer-executed process 800 illustrates the execution of the server as the user navigates a website created and implemented using the techniques herein. The computer-executed process 800 can be executed on a computer system (e.g., a hardware computer system such as the first machine 102 of FIG. 1). In this regard, the computer-executed process 800 can be implemented on computer-readable hardware that stores machine-executable program code, where the program code instructs a processor to implement the described computer-executed process 800. The computer-executed process 800 can also be executed by a hardware processor coupled to physical memory, where the processor is programmed by program code stored in the memory, to perform the described process.

The computer-executed process 800 starts at 802. The process 800 comprises receiving, at 804, from a remote computer, a request to access a website. The process 800 also comprises returning, at 806 to the remote computer, an object that characterizes a navigation capability of the website. The object includes data defining a navigation parameter that specifies a navigation page of the website to load into a browser and a query parameter that specifies a subset of content of the navigation page to load into the browser. More typically, the corresponding website will have a plurality of navigation pages. Accordingly, the object will include a plurality of navigation parameters, each navigation parameter specifying an associated one of the plurality of navigation pages of the web site to load, and a plurality of query parameters, each query parameter specifying a unique subset of content to present from a corresponding one of the plurality of navigation pages. Here, a script executable on the remote computer dynamically generates a navigation structure based upon the content of the object. The navigation structure includes a navigation component selectable to navigate the website.

The process 800 also comprises receiving, at 808, from the remote computer, a request for content (e.g., a subset of a user-requested navigation page). The request is formatted using object data including a select one of the navigation parameters to designate the requested navigation page, and at least one query parameter that specifies a subset of the requested navigation page. The process 800 yet further comprises sending, at 810, to the remote computer, the requested subset of the navigation page without responding with an entire page reload.

The example of FIG. 8 can incorporate techniques and methods set out more fully herein. For instance, the process 800 can store the navigational pages by creating a hierarchical arrangement of storage folders, each folder storing a related navigation page in a manner that corresponds to the navigation parameters of the object. Moreover, the object may be provided by generating the object as a JavaScript Object Notation (JSON) object having attribute-values pairs that describe the navigational capabilities of the website. Yet further, the process can receive, from the remote computer, a request for content comprises receiving an AJAX request formatted from data specified as a composite resource identifier, the composite resource identifier having a primary resource identifier corresponding to an address of the website, a delimiter, a subordinate resource identifier that identifies the navigation page, where the subordinate resource identifier is derived from the navigation parameter, and at least one query derived from the query parameter, which specifies a subset of content of the navigation page, as set out in greater detail herein.

Yet further, the process can carry out operations such as determining that the navigation page associated with the subordinate resource identifier has already been loaded, and responding by executing the at least one query and returning only the query results, returning default data where a query is judged to be invalid, configuring the navigation page to handle query calls associated with the query parameter of the object to generate the correct content, and other functions set out more fully herein.

Working Example to Show Reduced File Size Transfers

Figure 9:
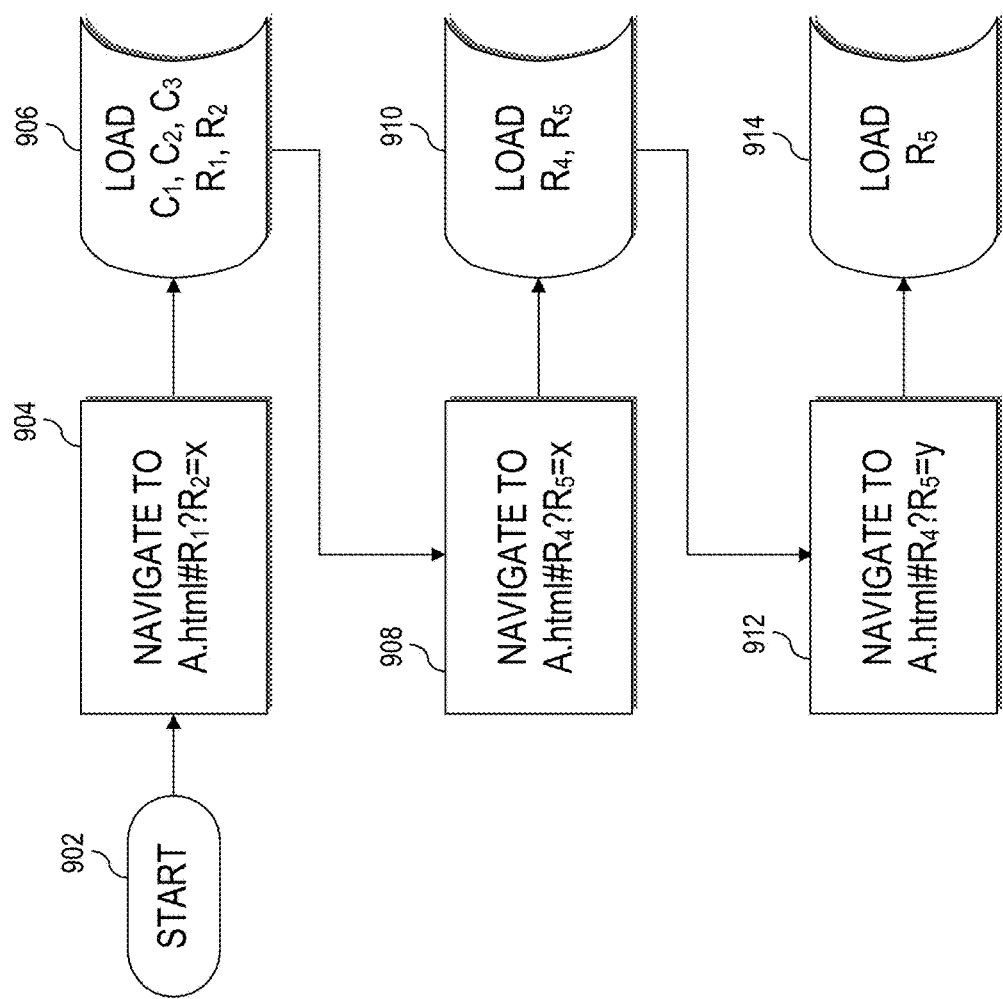
FIG. 9 is a flow chart illustrating a computer-executed process that implements the ability to reduce data transfers when navigating an example website, according to aspects of the present disclosure.

Referring to FIG. 9, a simplified example shows the efficiencies of aspects of the present disclosure. Assume that for each resource common to all pages, $C_x$ is weighted at 300 kilobytes. Each resource not common to all pages is weighted at 100 kilobytes. The process starts at 902, and navigates at 904 to A.html#$R_1R_2$=x. Assume that this causes the web-enabled application to load at 906, $C_1$, $C_2$, $C_3$, $R_1$, and $R_2$ for a total of 1,100 kilobytes. By way of comparison, a conventional page would navigate to A.html?page-$R_1$&$R_x$=x, thus loading $C_1$, $C_2$, $C_3$, $R_1$, and $R_2$ for a total of 1,100 kilobytes.

Assume now that the user navigates at 908 to A.html#$R_4$?$R_5$=x. The web-enabled application thus loads at 910, $R_4$ and $R_5$ for a total of 200 kilobytes. By way of comparison, a conventional browser would have to navigate to A.html?page=$R_4$&$R_5$=x, thus loading $C_1$, $C_2$, $C_3$, $R_4$, and $R_5$ for another 1,100 kilobyte load.

Continuing with the example, assume the user then navigates to A.html#$R_4$?$R_5$=y. Here, the inventive system only needs to load $R_5$ for a total of 100 kilobytes. Comparatively, the conventional system would have to navigate to A.html?page=$R_4$&$R_5$=y, thus loading $C_1$, $C_2$, $C_3$, $R_4$ and $R_5$, again for an 1,100 kilobyte load.

Thus, the entire operation of FIG. 9 costs 1,400 kilobytes of data transfer when implementing the process herein. By way of comparison, a conventional system would require 3,300 kilobytes of loading to accomplish the same tasks. While initial load time will remain the same, additional navigation about the site will be optimized by minimizing resource loads.

Example Computer System

Figure 10:
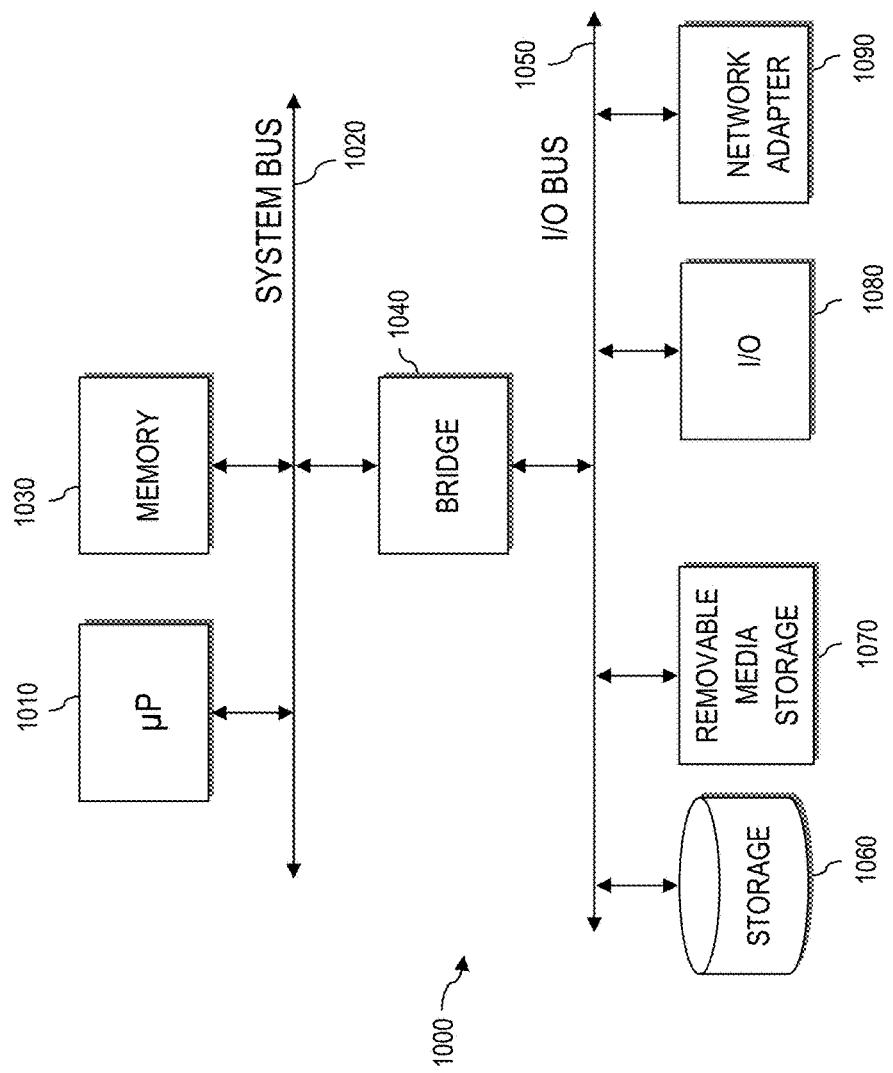
FIG. 10 is a block diagram of a computer system having a computer readable storage medium for implementing functions according to various aspects of the present disclosure as described in greater detail herein.

Referring to FIG. 10, a block diagram of a hardware data processing system is depicted in accordance with the present disclosure. Data processing system 1000 may comprise a symmetric multiprocessor (SMP) system or other configuration including a plurality of processors 1010 connected to system bus 1020. Alternatively, a single processor 1010 may be employed. Also connected to the system bus 1020 is local memory 1030. An I/O bus bridge 1040 interfaces the system bus 1020 to an I/O bus 1050. The I/O bus 150 is utilized to support one or more buses and corresponding devices, such as storage 1060, removable media storage 1070, input/output devices 1080, network adapters 1090, other devices, combinations thereof, etc. For instance, a network adapter 1090 can be used to enable the data processing system 1000 to communicate with other data processing systems or remote printers or storage devices through intervening private or public networks.

The memory 1030, storage 1060, removable media storage 1070, or combinations thereof can be used to store program code that is executed by the processor(s) 1010 to implement any aspect of the present disclosure described and illustrated in FIGS. 1-9.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but are not limited to, a portable computer diskette, a hard disk, a random access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction execution system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-executed process, comprising:
receiving, from a server, an object that characterizes a navigation capability of a website, the object having data comprising:
a navigation parameter that specifies a navigation page of the website to load into a browser; and
a query parameter that specifies a subset of content of the navigation page to load into the browser;
executing a script to dynamically generate a navigation structure based upon the object data, the navigation structure having a navigation component selectable to navigate the website;
detecting selection of the navigation component of the generated navigation structure; and
updating an address in a Uniform Resource Locator (URL) bar of the browser with a composite resource identifier to retrieve a requested subset of content of the navigation page, the composite resource identifier generated from the object and having:
a primary resource identifier corresponding to an address of the website;
a delimiter;
a subordinate resource identifier that identifies the navigation page, where the subordinate resource identifier is derived from the navigation parameter; and
at least one query derived from the query parameter, which specifies the requested subset of content of the navigation page, and
receiving, from the server, the requested subset of content of the navigation page, wherein the total file size of the requested subset of content of the navigation page is smaller than the total file size of the entire content of the navigation page.

2. The computer-executed process of claim 1, further comprising:
initiating a hashchange event in response to detecting an event indicative of a change in the composite resource identifier for changes occurring after the delimiter.

3. The computer-executed process of claim 2, wherein:
detecting an event indicative of a change in the composite resource identifier comprises detecting that the composite resource identifier has been edited by the dynamically generated navigation structure.

4. The computer-executed process of claim 2, further comprising:
using JavaScript to put a listener on a window.hashchange event;

wherein:
   detecting an event indicative of a change in the composite resource identifier further comprises detecting, by the listener, an action triggered by the window.hashchange event.

5. The computer-executed process of claim 1, further comprising:
   detecting a selection of an element in a graphical user interface of the browser that triggers an update to the composite resource identifier.

6. The computer-executed process of claim 1, further comprising:
   detecting an action for bookmarking a context based upon the composite resource identifier such that when a user returns to a bookmarked page, the page will be loaded to the bookmarked context with no need to re-click a button to return to the desired context.

7. The computer-executed process of claim 1, further comprising:
   providing within a user interface of the browser, a control that allows a user to specify what information to display, and at what interval to refresh that information based upon updates to the composite resource identifier.

8. The computer-executed process of claim 1, wherein:
   receiving, from a server, an object, comprises receiving the object as a JavaScript Object Notation (JSON) object.

9. The computer-executed process of claim 1, further comprising:
   rendering multiple sections of information on the navigation page, where a query string associated with the query parameter allows a user to specify which of the multiple sections of information to view.

10. The computer-executed process of claim 1, further comprising:
    requesting the navigation page via at least one AJAX call based upon the composite resource identifier.

11. A computer-executed process, comprising:
    receiving, from a remote computer, a request to access a website;
    returning, to the remote computer, an object that characterizes a navigation capability of the website, the object having data comprising:
       a navigation parameter that specifies a navigation page of the website to load into a browser; and
       a query parameter that specifies a subset of content of the navigation page to load into the browser;
       wherein a script is executable on the remote computer to dynamically generate a navigation structure based upon the object data, the navigation structure having a navigation component selectable to navigate the website;
    receiving, from the remote computer, a request for content comprised of a subset of the navigation page, wherein the request is derived from the object data, wherein: the navigation parameter specifies the navigation page; and the query parameter specifies at least one query string that specifies the requested subset of the navigation page; and
    sending, to the remote computer, the requested subset of the navigation page without responding with the entire navigation page, wherein the total file size of the requested subset of content of the navigation page is smaller than the total file size of the entire navigation page.

12. The computer-executed process of claim 11, wherein:
    the website comprises a plurality of navigation pages; and
    the object further comprises:
       a plurality of navigation parameters, each navigation parameter specifying an associated one of the plurality of navigation pages of the website to load; and
       a plurality of query parameters, each query parameter specifying a unique subset of content to present from a corresponding one of the plurality of navigation pages;
    the computer-executed process further comprising:
       storing the plurality of navigation pages of the website in an organizational structure identifiable from the content of the object file.

13. The computer-executed process of claim 12, wherein storing the navigational pages comprises creating a hierarchical arrangement of storage folders, each folder storing a related navigation page in a manner that corresponds to the navigation parameters of the object.

14. The computer-executed process of claim 11 further comprising:
    generating the object as a JavaScript Object Notation (JSON) object having attribute-values pairs that describe the navigational capabilities of the website.

15. The computer-executed process of claim 11, wherein:
    receiving, from the remote computer, a request for content comprises receiving an AJAX request formatted from data specified as a composite resource identifier, the composite resource identifier having:
       a primary resource identifier corresponding to an address of the website;
       a delimiter;
       a subordinate resource identifier that identifies the navigation page, where the subordinate resource identifier is derived from the navigation parameter; and
       at least one query derived from the query parameter, which specifies a subset of content of the navigation page.

16. The computer-executed process of claim 15, further comprising:
    determining that the navigation page associated with the subordinate resource identifier has already been loaded, and responding by executing the at least one query and returning only the query results.

17. The computer-executed process of claim 11, further comprising returning default data where a query is judged to be invalid.

18. The computer-executed process of claim 11, further comprising configuring the navigation page to handle query calls associated with the query parameter of the object to generate the correct content.

19. A system comprising:
    a computer processing circuit and
    a computer memory storing instructions that when executed by the computer processing circuit cause the system to perform operations comprising:
       receiving, from a remote computer, a request to access a web site associated with plurality of navigation pages;
       returning, to the remote computer, an object that characterizes a navigation capability of the website, the object having data comprising:
          a plurality of navigation parameters, each navigation parameter specifying an associated one of the plurality of navigation pages of the website to load; and a plurality of query parameters, each query parameter specifying a unique subset of content to present from a corresponding one of the plurality of navigation pages;

wherein a script is executable on the remote computer to dynamically generate a navigation structure based upon the object data, the navigation structure having navigation components selectable to navigate the plurality of navigation pages of the website;

receiving, from the remote computer, a request for content of a select one of the plurality of navigation pages, wherein the request is derived from object data including:

at least one navigation parameter that designates the select one of the plurality of navigation pages; and at least one query parameter that specifies a subset of the select one of the plurality of navigation pages; and sending, to the remote computer, the requested subset of the subset of the select one of the plurality of navigation pages without responding with the entire navigation page, wherein the total file size of the requested subset of content of the navigation page is smaller than the total file size of the entire navigation page.

20. The system of claim 19, further comprising a storage that stores the plurality of navigation pages using a hierarchical arrangement of storage folders, each folder storing a related navigation page in a manner that corresponds to the navigation parameters of the object.

* * * * *